(12) United States Patent  
Vopel

(10) Patent No.: US 9,773,602 B2  
(45) Date of Patent: Sep. 26, 2017

(54) METHOD FOR CONTROLLING AN ACTUATOR

(71) Applicant: Schaeffler Technologies AG & Co. KG, Herzogenaurach (DE)

(72) Inventor: David Vopel, Herzogenaurach (DE)

(73) Assignee: Schaeffer Technologies AG & Co. KG, Herzogenaurach (DE)

( * ) Notice: Subject to any disclaimer, the term of this patent is extended or adjusted under 35 U.S.C. 154(b) by 447 days.

(21) Appl. No.: 14/414,250

(22) PCT Filed: Jul. 1, 2013

(86) PCT No.: PCT/EP2013/063834  
§ 371 (c)(1),  
(2) Date: Jan. 12, 2015

(87) PCT Pub. No.: WO2014/009193  
PCT Pub. Date: Jan. 16, 2014

(65) Prior Publication Data  
US 2015/0194250 A1  Jul. 9, 2015

(30) Foreign Application Priority Data

Jul. 12, 2012  (DE) .................. 10 2012 212 242

(51) Int. Cl.  
*H01F 7/06* (2006.01)  
*F01L 1/047* (2006.01)  
(Continued)

(52) U.S. Cl.  
CPC .............. *H01F 7/064* (2013.01); *F01L 1/047* (2013.01); *F01L 13/0015* (2013.01);  
(Continued)

(58) Field of Classification Search  
CPC ...... H01F 7/064; H01F 7/1615; H01F 7/1844; H01F 7/1805; H01F 2007/185;  
(Continued)

(56) References Cited

U.S. PATENT DOCUMENTS 4,387,280 A * 6/1983 Iman ................. H01H 33/34  
200/34  
5,691,680 A 11/1997 Schrey et al.  
(Continued)

FOREIGN PATENT DOCUMENTS

CN  102245881  11/2011  
CN  102472188  5/2012  
(Continued)

*Primary Examiner* — Zeev V Kitov  
(74) *Attorney, Agent, or Firm* — Volpe and Koenig, P.C.

(57) ABSTRACT

A method for operating an electromagnetic actuator (10) with an actuating pin (9) is proposed which comprises the following steps: —determining a pin actuation actual dead time (t11), during which the magnetic armature (15) is substantially immobile while a magnetic coil (12) is supplied with current, wherein the actual dead time ends with the current break-in at the magnetic coil, as a result of counter induction of the magnetic armature overcoming the magnetic force threshold; —determining, before a subsequent pin actuation, the starting time of the magnetic coil current supply, wherein the starting point of the current is advanced compared with that of the target movement start of the pin out of the actuator housing (13) and the determined actual dead time.

4 Claims, 3 Drawing Sheets

(51) Int. Cl.
    *F01L 13/00*     (2006.01)
    *H01F 7/16*     (2006.01)
    *H01F 7/18*     (2006.01)
    *F02D 41/20*     (2006.01)
    *F02D 41/00*     (2006.01)
    *F02D 41/24*     (2006.01)

(52) U.S. Cl.
    CPC ...... *F01L 13/0036* (2013.01); *F02D 41/0002* (2013.01); *F02D 41/20* (2013.01); *F02D 41/2464* (2013.01); *H01F 7/1615* (2013.01); *H01F 7/1805* (2013.01); *H01F 7/1844* (2013.01); *F01L 2013/0052* (2013.01); *F01L 2013/0078* (2013.01); *F02D 2041/001* (2013.01); *F02D 2041/2044* (2013.01); *F02D 2041/2055* (2013.01); *H01F 2007/185* (2013.01); *Y02T 10/42* (2013.01)

(58) Field of Classification Search
    CPC ... F01L 1/047; F01L 13/0036; F01L 13/0015; F01L 2013/0052; F01L 2013/0078; F02D 41/20; F02D 41/0002; F02D 41/2464; F02D 2041/001; F02D 2041/2044; F02D 2041/2055; Y02T 10/42
    See application file for complete search history.

(56) References Cited

U.S. PATENT DOCUMENTS

| | | | |
|---|---|---|---|
| 5,818,680 | A | 10/1998 | Schmitz et al. |
| 5,855,420 | A * | 1/1999 | Lawrence ............ B60T 8/4872 188/356 |
| 6,142,124 | A | 11/2000 | Fischer et al. |
| 7,323,858 | B2 * | 1/2008 | Hein .................... B41M 5/5218 324/71.1 |
| 9,121,360 | B2 | 9/2015 | Richter et al. |

FOREIGN PATENT DOCUMENTS

| | | |
|---|---|---|
| DE | 19518056 | 11/1996 |
| DE | 19526683 | 1/1997 |
| DE | 19735560 | 2/1999 |
| DE | 10129153 | 1/2003 |
| DE | 10150199 | 4/2003 |
| DE | 102007063479 | 11/2008 |
| DE | 102007031552 | 1/2009 |
| DE | 102009042777 | 4/2011 |
| DE | 102011078525 | 1/2013 |

* cited by examiner

METHOD FOR CONTROLLING AN ACTUATOR

The invention relates to a method for operating an electromagnetic actuator having a housing with a magnetic coil, an actuating pin, and a magnetic armature that moves, due to the impingement of magnetic force of the energized magnetic coil, the pin out of the housing in the extension direction, as well as a holding element that is arranged between the magnetic armature and the housing and blocks the movement of the magnetic armature below a magnetic force threshold.

BACKGROUND

Such an actuator is known from the unpublished DE 10 2011 078 525 A1, wherein the holding element is a permanent magnet that is arranged between the housing and the magnetic armature and holds the magnetic armature and the pin at rest until the magnetic force threshold is exceeded. The actuator is part of a valve train of an internal combustion engine with variable-lift gas-exchange valve actuation. The variable lift is generated by the camshaft that comprises a carrier shaft and a cam piece locked in rotation on this carrier shaft and arranged so that it can move between axial positions. The cam piece has at least one cam group of directly adjacent cams with different lifts and an axial slotted piece in which the pin of the actuator is coupled, in order to shift the cam piece on the carrier shaft between the axial positions and thus to switch the instantaneous cam lift pick-off from one cam to another cam.

The switching procedure should be precise and reproducible at the highest possible switching rotational speed and accordingly within the shortest amount of time and should be completed for all cylinders of the internal combustion engine within one work cycle. Ideally, all of the actuators are sufficiently quick and have no time variance with respect to the movement behavior of the pin moving out from the housing. In reality, however, the precise timing of the switching process is negatively affected by the varying extension movement of the pin due to production tolerances and the wear of the actuator components, as well as the large operating temperature range that causes not only varying friction relationships on the oiled actuator components, but also varying electrical resistance in the magnetic coils.

In the case of the variable lift valve train, the insufficiently precise timing of the actuator can lead to unacceptable incorrect switching of the cam pieces on the carrier shaft.

SUMMARY

The present invention is based on the objective of disclosing a method for operating an actuator of the type named above that allows, despite the disrupting effects negatively affecting the timing of the actuator, a movement profile that is as precise as possible in time for the pin extending out from the housing.

The solution to this objective is given through one or more features of the invention, while advantageous refinements and constructions of the invention can be taken from the description and claims. Accordingly, the method should comprise the following steps:

when a pin is actuated, determine an actual dead time during which the magnetic armature is essentially stationary when the magnetic coil is energized, wherein the actual dead time ends with the current in-rush to the magnetic coil due to counter induction of the magnetic armature overcoming the magnetic force threshold;

before a subsequent pin actuation, determine the beginning time point for energizing the magnetic coil, wherein the current beginning time point is advanced by the determined actual dead time relative to the desired movement beginning of the pin traveling out from the housing.

In the method according to the invention, the actual dead time of the actuator is monitored continuously and input as a current value into a downstream controller of the actuator. Thus, one of the significant disrupting influences on the timing of the actuator is minimized, namely the time variance of the actual beginning of movement of the pin. For an earlier pin actuation, this is realized by determining the actual dead time and for a subsequent later pin actuation, by holding the actual dead time, individually for each actuator. The behavior becomes more exact the more often the actual dead time is monitored and updated. Ideally, it is determined for each pin actuation and stored as the current control parameter in the control unit of the actuator. The actual dead time begins when the magnetic coil is energized and ends with the beginning of movement of the pin. The beginning of movement of the pin is defined as the time at which the current or voltage profile on the energized magnetic coil experiences a pronounced drop due to the counter induction of the magnetic armature that had been stationary up to then and is now moving outward. At this point, the dropping current of the voltage profile shows a maximum that can be evaluated precisely and results from the sudden acceleration of the magnetic armature overcoming the magnetic force threshold. The metrological determination of this characteristic current or voltage maximum can be found as such in the prior art, wherein a suitable measurement and evaluation circuit for the control unit can be found, in particular, in DE 101 50 199 A1.

BRIEF DESCRIPTION OF THE DRAWINGS

Additional features of the invention result from the following description and from the drawings in which the method according to the invention is explained as preferred but nevertheless as an example application for a variable lift valve train of the type named above. If not mentioned otherwise, features or components that are identical or that have identical functions are provided with identical reference symbols. Shown are.

DETAILED DESCRIPTION OF THE PREFERRED EMBODIMENTS

Figure 1:
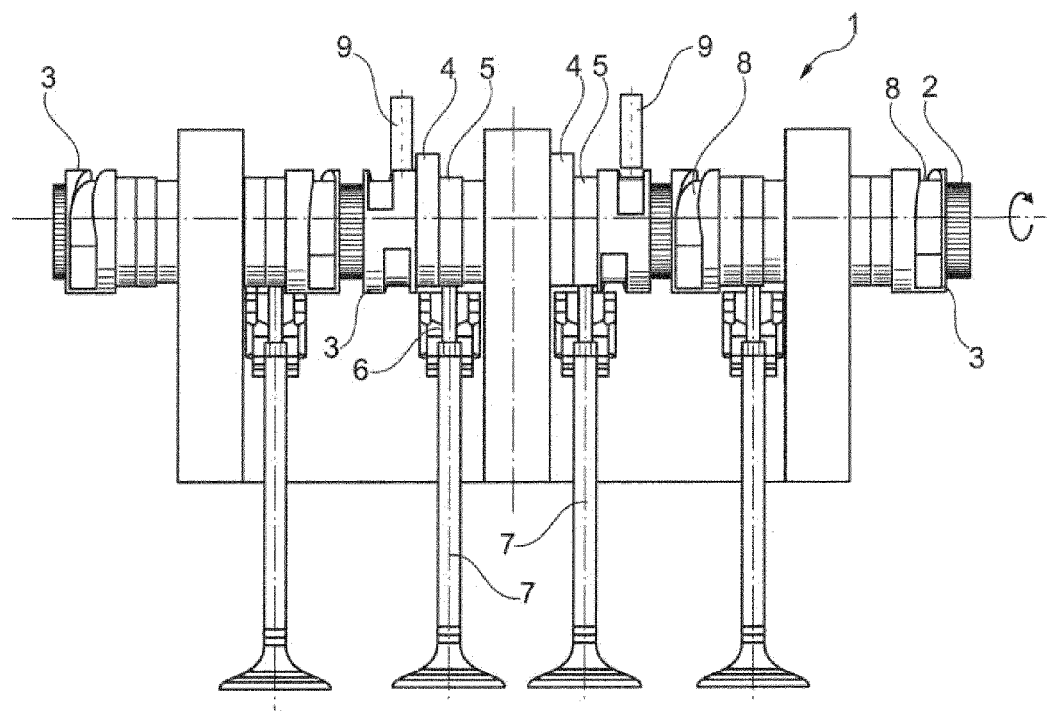
FIG. 1 a known valve train in side view.

FIG. 1 shows a variable lift valve train 1 of an internal combustion engine whose basic functioning principle can be summarized in that a conventional, rigidly formed camshaft is replaced by a carrier shaft 2 with external teeth and cam pieces 3 that are arranged on this carrier shaft and are locked in rotation by means of internal teeth and movable in the longitudinal direction. Each cam piece 3 has two groups of axially adjacent cams 4 and 5 whose different lift profiles are transferred via cam followers 6 to gas exchange valves 7. The displacement of the cam piece 3 on the carrier shaft 2 required for the operating point-dependent activation of each cam 4 or 5 is realized by spiral-shaped axial slotted pieces 8 on the cam piece 3 that differ in their orientation according to the direction of displacement and in which a cylindrical pin 9 of an electromagnetic actuator 10 (see FIG. 5) is coupled according to the instantaneous position of the cam piece 3.

Figure 2:
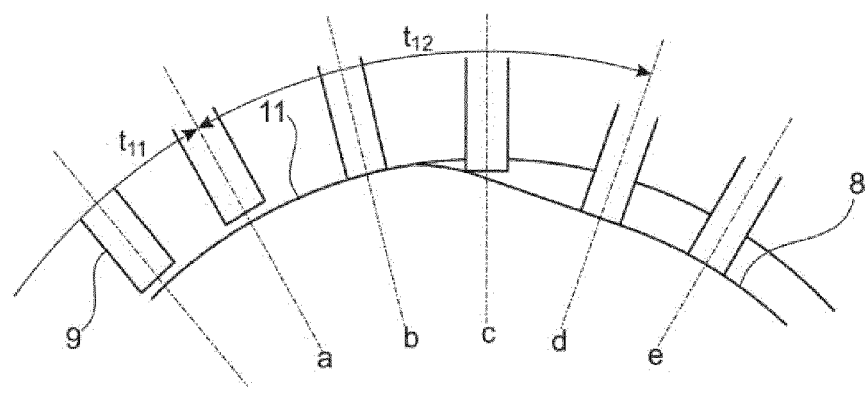
FIG. 2 a cross-sectional view through the axial slotted piece according to FIG. 1 with a schematic sequence of the coupling actuator pin, FIG. 3 the actuator timing with respect to the cam angle without using the method according to the invention, FIG. 4 the actuator timing with respect to the cam angle using the method according to the invention, FIG. 5 an actuator of the valve train in a simplified longitudinal section view, FIG. 6 the typical current/voltage profile on the magnetic coil for controlling the actuator according to FIG. 5, FIG. 7 the typical path profile of the magnetic armature for controlling the actuator according to FIG. 5, and FIG. 8 a characteristic map for testing the plausibility of the determined actual dead times of the actuator.

FIG. 2 shows a sequence of the pin 9 coupling in the groove-shaped axial slotted piece 8. The pin is located at a distance to the high circle 11 and at rest up to the angle position a. At this point in time, the actual dead time designated with t11 ends for the already energized actuator 10 and the pin 9 begins with its extension movement in the direction of the axial slotted piece 8. At the angle position b, the pin 9 is set on the high circle 11 and then follows the axial slotted piece 8 that dips relative to the high circle 11, as shown with the angle positions c, d, and e. The groove depth of the axial slotted piece 8 remains constant starting from the position d, so that, at this position, the extension movement of the pin 9 stops. The time between the end of the actual dead time t11 and reaching the position d is designated as the coupling time t12.

An essential element for the success of the switching process of all cam pieces 3 within the same camshaft revolution is now the precise control timing of the actuators 10, so that all pins 9 couple in their axial slotted pieces 9 at the correct time. This is illustrated with reference to FIGS. 3 and 4 that show the influence of the varying actual dead time t11 on the success of the switching process. Shown in each are the time events of the actuator 10 relevant for the switching process of the cam piece 3 versus the cam angle.

Figure 3:
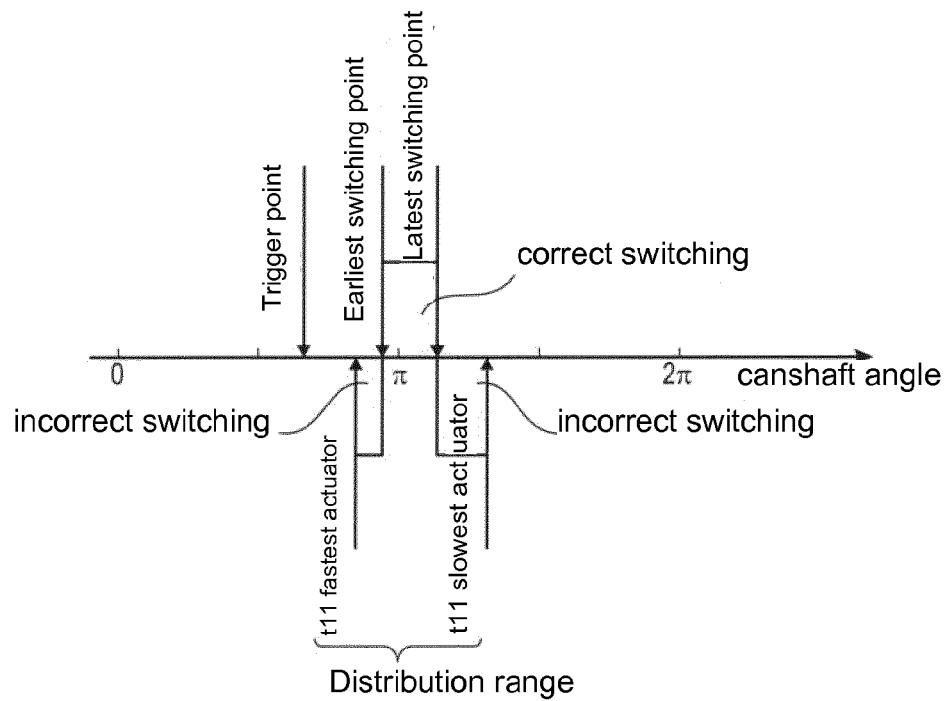

FIG. 3 shows the previously typical activation of the actuator 10, i.e., without using the control method according to the invention.

The control of the actuator 10 is here realized without the exact knowledge of the actual dead time t11. Typically, minimum and maximum dead time values t11 obtained by means of statistical methods are used for control. The necessity to design the control for extreme parts (very slow and very fast) limits the functional range of the average system. Thus, the rotational speed band in which a switching process of the cam piece 3 is permissible can be selected only very conservatively. In addition, for reasons of exorbitant increase in the variance, the switching at low temperatures must be limited to an initial actuation for ensuring the reference lift curve/cylinder number.

The control of the actuators 10 is typically realized by transistors that are switched by the control unit (not shown). Here, the magnetic coil 12 of each actuator 10 (see FIG. 5) is controlled in time with the available electric system voltage. The control of the actuator 10 and its actual dead time t11 begins at the time "trigger point." For a successful switching process ("proper event") of the cam piece 3 it is decisive that the beginning of movement of the pin 9 takes place at the earliest at the time "earliest switching point" at the angle position a (see FIG. 2) and at the latest at the time "latest switching point." The variance band designated in the diagrams with "scatter band" for the variance caused during operation of the actual dead time t11, especially due to wear and temperature influences, is now greater than that at the available time of the "proper event." This leads to emission-related incorrect switching of the cam piece 3 ("erroneous event"), wherein, on one hand, the actual dead time t11 of the fastest actuator 10 ("t11 fastest actuator") is too short and its pin 9 already moves out before the angle position a and, on the other hand, the actual dead time t11 of the slowest actuator 10 ("t11 slowest actuator") is too long and its pin 9 moves out only after the angle position a.

Figure 4:
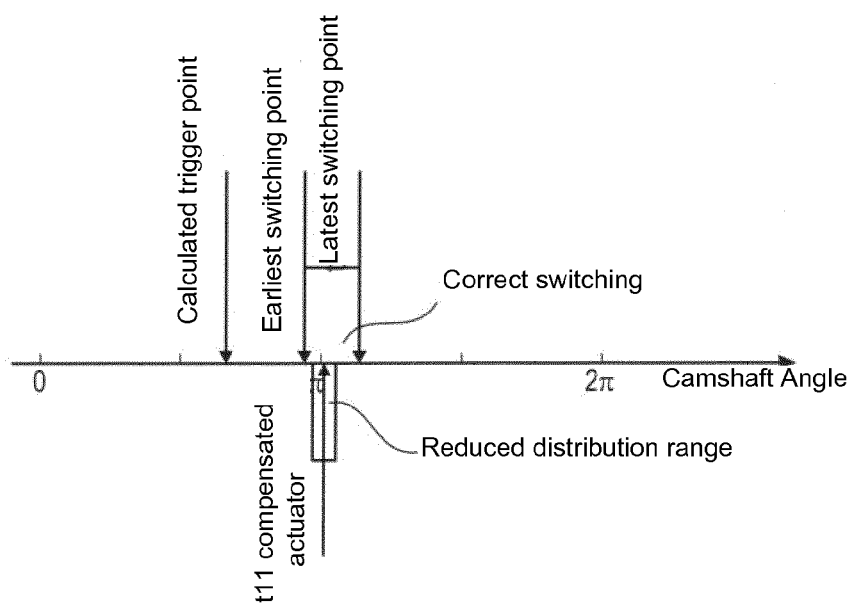

FIG. 4 shows a control of the actuator 10 accordingly using the method according to the invention.

Figure 8:
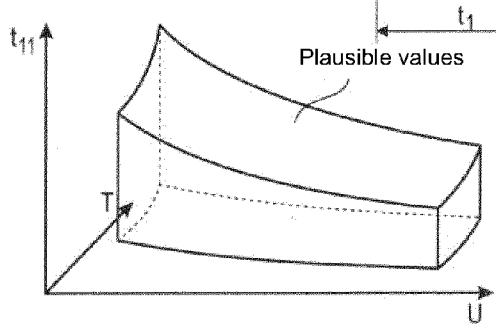

In this case, the control of the actuator 10 takes place with knowledge of the individual actual dead time t11 of the actuator 10 that was determined in an earlier switching process of the associated cam piece 3—the determination itself will be explained further below with reference to FIGS. 5 and 8. The determined actual dead time t11 ("t11 rated actuator") is now subtracted from a time lying within the "proper event" for the desired beginning of movement of the pin 9 at the angle position a, so that the beginning time point calculated in this way for later energizing of the actuator ("calculated trigger point") is moved ahead by the previously determined actual dead time t11. The beginning of this current is also determined individually for each actuator 10. It can be clearly seen that the variance band of the actual dead time t11 actually occurring during the now following switching process of the cam piece 3 ("reduced scatter band") is considerably smaller and within the time interval required for the "proper event."

Figure 5:
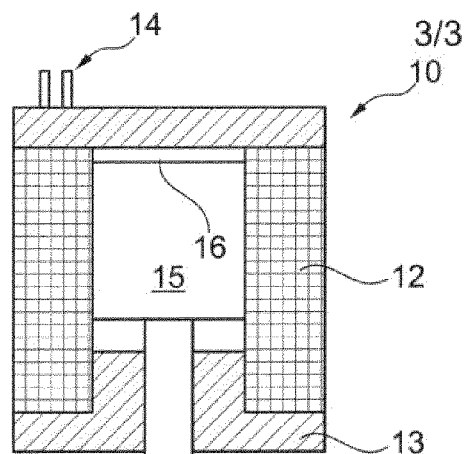
Figure 5:
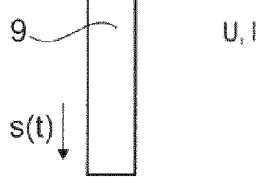

FIG. 5 shows the principle setup of an actuator 10 that is suitable for the method according to the invention. This comprises a housing 13 with the magnetic coil 12 and contacting 14 of the coil 12, the actuating pin 9, and the magnetic armature 15 that moves the pin 9 in the extension direction out from the housing 13 with the impingement of magnetic force through the energized magnetic coil 12. A retaining element 16 arranged between the magnetic armature 15 and the housing 13 blocks the movement of the magnetic armature 15 and the pin 9 until the magnetic force of the magnetic coil 12 exceeds the magnetic force threshold of the retaining element 16. The retaining element 16 is a permanent magnet in the shown embodiment.

Figure 6:
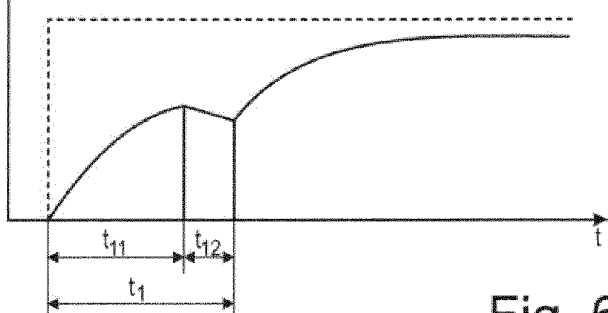
Figure 7:
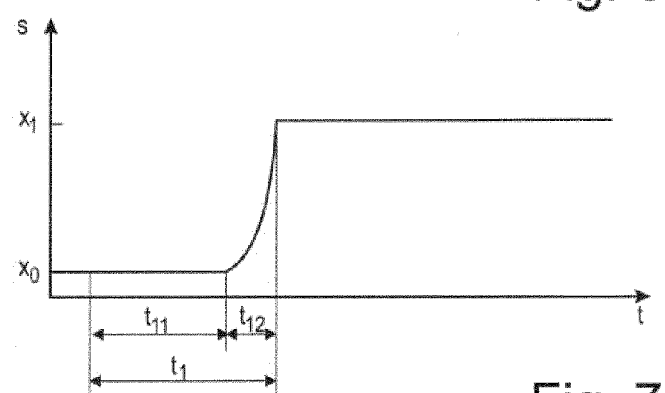

FIG. 6 shows the current/voltage profile U/I of the energized magnetic coil 12 versus the time t and FIG. 7 shows the associated path profile s(t) of the pin 9 moving out from the housing 13. During the dead time t11, the current I and voltage U of the magnetic coil 12 increase, wherein its magnetic force is not yet sufficiently large to overcome the retaining force of the permanent magnet 16 acting against it. The magnetic armature 15 and the pin 9 remain at rest at x0 accordingly. At the end of the dead time t11 and at the beginning of the coupling time t12, the magnetic field of the magnetic coil 12 overcomes the blocking magnetic force threshold of the permanent magnet 16, so that the magnetic armature 15 drives the pin 9 out of the housing 13 and the armature movement generates a counter induction in the magnetic field of the magnetic coil 12. For the duration of the magnetic armature movement, the counter induction induces a current that acts against the current driven by the electric system and depends, among other things, on the velocity of the magnetic armature 15. During the coupling time t12 of the magnetic armature 15 and the pin 9, the sum characteristic curve of both currents shows a characteristic drop that begins with a change in slope in the characteristic curve that can be evaluated precisely. The time of the change in slope is determined with the help of a known measurement and evaluation circuit (see above) and defines the end of the actual dead time t11 and the beginning of the coupling time t12.

The coupling time t12 ends at the time when the pin 9 reaches the angle position d and remains in the extended rest position x1 in the further movement of the axial slotted piece 8. From this time point on, the magnetic armature 15 also remains at rest, so that the counter induction goes to zero and the current/voltage profile increases again.

The actual dead time t11 determined for each actuator 10 is stored updated for a subsequent pin actuation in the control unit of the actuator 10. The determined value can be checked for plausibility in advance, for which the characteristic map shown in FIG. 8 for the dead time values t11 designated with "plausible values" is used for reference. As input parameters for the characteristic map, the coil temperature T and the current electric system voltage U are used. With the help of the continuously determined actual dead times t11 and the information on temperature and voltage, the present characteristic map can be continuously updated. It is further possible to divide the characteristic map into the cases of first switching and continued switching, in order to take into account setting phenomena after the valve train 1 has been stopped for long periods of time.

LIST OF REFERENCE NUMBERS

1 Valve train
2 Carrier shaft
3 Cam piece
4 Cam
5 Cam
6 Cam follower
7 Gas exchange valve
8 Axial slotted piece
9 Actuator pin
10 Actuator
11 High circle
12 Magnetic coil
13 Actuator housing
14 Contacting
15 Magnetic armature
16 Holding element/permanent magnet

The invention claimed is:

1. A method for operating an electromagnetic actuator, comprising a housing with a magnetic coil, an actuating pin, and a magnetic armature, for moving the pin with magnetic force impingement through the energized magnetic coil in an extension direction out from the housing, and a holding element that is arranged between the magnetic armature and the housing and blocks movement of the magnetic armature below a magnetic force threshold, the method comprises the following steps:

when the pin is actuated, determining an actual dead time during which the magnetic armature is essentially stationary when the magnetic coil is energized, the actual dead time ending with a current in-rush to the magnetic coil due to counter induction of the magnetic armature overcoming the magnetic force threshold;

before a subsequent pin actuation, determining a beginning time point for energizing the magnetic coil, and advancing the current beginning time point by the determined actual dead time relative to a desired movement beginning of the pin traveling out from the housing.

2. The method according to claim 1, further comprising determining the actual dead time each time the pin is actuated and storing the actual dead time up to date in a control unit of a actuator.

3. The method according to claim 1, further comprising checking the determined actual dead time for plausibility using a desired dead time characteristic map.

4. The method according to claim 3, wherein the dead times of the magnetic armature stored in the desired dead time characteristic map depend at least on a voltage (U) and a temperature (T) of the magnetic coil as parameters influencing the actual dead times of the magnetic armature.

* * * * *